United States Patent
Li et al.

(10) Patent No.: US 11,399,300 B2
(45) Date of Patent: Jul. 26, 2022

(54) FAST ACCESS TO NEIGHBOR CELL SYNCHRONIZATION SIGNALS IN NR

(71) Applicant: Telefonaktiebolaget LM Ericsson (publ), Stockholm (SE)

(72) Inventors: Shaohua Li, Beijing (CN); Jianfeng Wang, Beijing (CN)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 292 days.

(21) Appl. No.: 16/468,523

(22) PCT Filed: Dec. 26, 2016

(86) PCT No.: PCT/CN2016/112042
§ 371 (c)(1),
(2) Date: Jun. 11, 2019

(87) PCT Pub. No.: WO2018/119558
PCT Pub. Date: Jul. 5, 2018

(65) Prior Publication Data
US 2020/0084651 A1    Mar. 12, 2020

(51) Int. Cl.
*H04W 24/10* (2009.01)
*H04L 5/00* (2006.01)
(Continued)

(52) U.S. Cl.
CPC ............ *H04W 24/10* (2013.01); *H04L 5/005* (2013.01); *H04L 5/0053* (2013.01); *H04W 36/0077* (2013.01); *H04W 48/12* (2013.01)

(58) Field of Classification Search
USPC ........................................................ 370/329
See application file for complete search history.

(56) References Cited

U.S. PATENT DOCUMENTS 7,447,931 B1 * 11/2008 Rischar ................. H04J 3/0697
713/400
2011/0007657 A1 * 1/2011 Kazmi ................. H04J 11/0093
370/252
(Continued)

FOREIGN PATENT DOCUMENTS

CN       102026216 A      4/2011
CN       103329593 A      9/2013
(Continued)

OTHER PUBLICATIONS

Supplementary European Search Report and Written Opinion dated Sep. 4, 2020 for International Application No. EP 16925467, consisting of 8-pages.
(Continued)

*Primary Examiner* — Gregory B Sefcheck
*Assistant Examiner* — Majid Esmaeilian
(74) *Attorney, Agent, or Firm* — Christopher & Weisberg, P.A.

(57) ABSTRACT

The disclosure pertains to a method for operating a user equipment in a radio access network. The method includes measuring first synchronisation signaling associated to a first cell of the radio access network, wherein for measuring a set of parametrisations of the first synchronisation signaling is utilised, in which the set of parametrisations is determined based on a signaling parametrisation of second synchronisation signaling associated to a second cell of the radio access network, and further based on a mapping of the signaling parametrization to the first set of parametrisations. The disclosure also pertains to related methods and devices.

17 Claims, 6 Drawing Sheets

(51) Int. Cl.
*H04W 36/00* (2009.01)
*H04W 48/12* (2009.01)

(56) References Cited

U.S. PATENT DOCUMENTS

| | | | |
|---|---|---|---|
| 2013/0039220 A1* | 2/2013 | Ruffini | H04J 3/0679 |
| | | | 370/255 |
| 2014/0162656 A1 | 6/2014 | Chai et al. | |
| 2014/0192826 A1* | 7/2014 | Zampetti | H04J 3/0658 |
| | | | 370/503 |
| 2015/0280849 A1* | 10/2015 | Tsai | H04L 27/2672 |
| | | | 370/328 |
| 2015/0281020 A1 | 10/2015 | Yun et al. | |
| 2015/0358848 A1 | 12/2015 | Kim et al. | |
| 2016/0270017 A1 | 9/2016 | Palanki et al. | |
| 2020/0019208 A1* | 1/2020 | You | H04L 65/4092 |
| 2020/0045134 A1* | 2/2020 | Rozas | G06F 3/0604 |

FOREIGN PATENT DOCUMENTS

| | | |
|---|---|---|
| EP | 3213568 | 5/2016 |
| WO | 2007147853 A1 | 12/2007 |
| WO | 2011102769 A1 | 8/2011 |
| WO | 2016066204 A1 | 5/2016 |

OTHER PUBLICATIONS

International Search Report and Written Opinion dated Sep. 15, 2017 for International Application No. PCT/CN2016/112042 filed on Dec. 26, 2016, consisting of 6-pages.
Chinese Office Action and English Summary dated Apr. 24, 2022 for Application No. 201680091881.X, consisting of 11 pages.

* cited by examiner

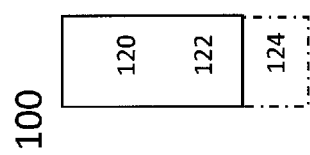

FAST ACCESS TO NEIGHBOR CELL SYNCHRONIZATION SIGNALS IN NR

CROSS-REFERENCE TO RELATED APPLICATIONS

This application is a Submission Under 35 U.S.C. § 371 for U.S. National Stage Patent Application of International Application Number: PCT/CN2016/112042, filed Dec. 26, 2016 entitled "FAST ACCESS TO NEIGHBOR CELL SYNCHRONIZATION SIGNALS IN NR," the entirety of which is incorporated herein by reference.

TECHNICAL FIELD

The present disclosure pertains to wireless communication technology, in particular synchronisation signaling.

BACKGROUND

A modern user equipment (UE) typically performs different measurements on cells, not only the serving cell it is connected to, but also other (neighboring) cells, which it may be able to detect. Such measurements can in particular be used for handover and are helpful for efficient communication. However, performing measurements, can impact on ongoing operation, in particular if a receiver has to be tuned for different frequencies, or if a large frequency range has to be scanned (a frequency raster has to be performed), e.g. to find neighboring cells.

SUMMARY

It is an object of the present disclosure to provide approaches facilitation measuring synchronisation signaling and/or cells, in particular in the context of neighboring cells.

Accordingly, there is disclosed a method for operating a user equipment in a radio access network. The method comprises measuring first synchronisation signaling associated to a first cell of the radio access network, wherein for measuring a set of parametrisations of the first synchronisation signaling is utilised. The set of parametrisations is determined based on a signaling parametrisation of second synchronisation signaling associated to a second cell of the radio access network and based on a mapping of the signaling parametrization to the first set of parametrisations.

There is also described a user equipment for a radio access network. The user equipment is adapted for measuring first synchronisation signaling associated to a first cell of the radio access network. For measuring, a set of parametrisations of the first synchronisation signaling is utilised, wherein the set of parametrisations is determined based on a signaling parametrisation of second synchronisation signaling associated to a second cell of the radio access network and based on a mapping of the signaling parametrization to the first set of parametrisations. The user equipment may be adapted for using processing circuitry and/or radio circuitry for measuring, and/or comprise a measuring module for such measuring. The radio circuitry may in particular comprise a receiver.

Measuring may comprise performing measurements on and/or detecting and/or identifying and/or finding the first synchronisation signaling and/or the associated cell, and/or trying such, in particular based on synchronisation signaling. Measuring may comprise cell search and/or cell identifying and/or synchronising with, or to, a cell or synchronisation signaling and/or determining a timing of the cell and/or synchronisation signaling, and/or determining one or more parameters associated to the cell, and/or to the associated synchronisation signaling.

Measuring utilising a set of parametrisations may generally comprise adapting and/or performing measurements assuming based on one or more parameters of the parametrisation, and/or assuming, for measuring, that the parametrisation correctly describes the characteristics of the cell or synchronisation signaling.

Measuring utilising a set of parametrisations may comprise performing measurements utilising a plurality of parametrisations of the set, and/or comparing such measurements to determine a correct and/or best and/or most suitable parametrisation.

It may be considered that measuring comprises determining and/or reporting a measurement report, e.g. to a network node. In a variant, measuring may be performed further based on configuration information pertaining to the first synchronisation signaling and/or the associated cell.

The mapping may be configured to the user equipment, e.g. by a network node and/or control node. Alternatively or additionally, the mapping may be stored in, and/or read from, a memory, e.g. by suitably adapted processing circuitry.

A method for operating a network node in a radio access network may be considered. The method comprises transmitting first synchronisation signaling in a first cell of the radio access network, the first cell being controlled by the network node. The first synchronisation signaling is represented by a first parametrisation, wherein the first parametrization is chosen from a set of parametrisations, the set of parametrisations being determined based on a mapping from a signaling parametrisation representing second synchronisation signaling associated to a second cell of the radio access network to the set of parametrisations.

Moreover, a network node for a radio access network, the network node being adapted for transmitting first synchronisation signaling in a first cell of the radio access network controlled by the network node, the first synchronisation signaling being represented by a first parametrisation, wherein the first parametrization is chosen from a set of parametrisations, the set of parametrisations being determined based on a mapping from a signaling parametrisation representing second synchronisation signaling associated to a second cell of the radio access network to the set of parametrisations. The network node may be adapted to use processing circuitry and/or radio circuitry, e.g. a transmitter, for the transmitting, and/or comprise a transmitting module for the transmitting. In this disclosure, this network node may be referred to as first network node.

The network node may be a gNB or eNB. It may be considered that the mapping and/or set is configured to the network node, e.g. by another network node, in particular the second network node, and/or a control node.

The set of parametrisations may be limited to one or more parametrisations, and/or may have fewer elements than a corresponding set utilised by a user equipment.

There may be envisioned a method for operating a control node in a wireless communication network. The method comprises indicating, to a network node, a set of parametrisations representing first synchronisation signaling to be associated to a first cell of the second network node, the set of parametrisations being determined based on a signaling parametrisation of synchronisation signaling associated to a first cell.

Also, a control node for a wireless communication network is suggested. The network node is adapted for indicating, to a network node, a set of parametrisations representing first synchronisation signaling to be associated to a first cell of the second network node. The set of parametrisations is determined based on a signaling parametrisation of synchronisation signaling associated to a first cell. The control node may be adapted to use processing circuitry and/or radio circuitry (or a wire or cable connection), e.g. a transmitter (or copper wire or optical cable/fibre), for such indicating, and/or comprise an indicating module for such indicating.

Generally, indicating a set may comprise providing information or indication representing the set, e.g. utilising a wire and/or cable connection, and/or transmitting such information.

Indicating a set may comprise and/or be implemented as configuring the set. In this case, the indicating module may be a configuring module.

Moreover, a program product comprising instructions is proposed. The instructions cause processing circuitry to perform and/or control any one of any combination of methods described herein. Instructions may be implemented as or in code. Instructions and/or code may be executable by the processing circuitry.

A carrier medium arrangement is considered, the carrier medium arrangement carrying and/or storing a program product as disclosed herein.

The approaches discussed herein allow quicker measuring of synchronisation signaling, as the set parametrisations allow quicker access time to synchronisation signaling and/or associated cells.

The first cell may generally be a neighboring cell and/or a non-serving cell, relative to the user equipment. The second cell may be a serving cell for the user equipment. The first cell may be provided and/or controlled by a first network node, which may be in particular a gNB. The second cell may be provided by a second network node, which may in particular be implemented as gNB. The control node may generally be a network node adapted to control one or more radio nodes, or may be a radio node for a network itself. In some variant, the control node may be a node of a core network.

Synchronisation signaling may be considered a form of reference signaling and/or may be considered downlink signaling. It may be considered that synchronisation signaling comprises one or more, in particular two, components, for example primary synchronisation signaling and/or secondary synchronisation signaling. Synchronisation signaling, respectively a component thereof, may comprise a signaling sequence, e.g. a series of signals or symbols, which may be in a specific pattern and/or transmission mode. Synchronisation signaling may be assigned to and/or be transmitted on and/or around a synchronisation frequency or frequency interval, which may comprise one or more subcarriers. A timing, time or time shift may be associated to synchronisation signaling, which may e.g. indicate where in a sequence the synchronisation signaling is, and/or provide (primary or secondary) synchronisation.

A parametrisation may generally comprise one or more parameters. A set of parametrisations may comprise one or more parametrisations. A signaling parametrisation may be considered a known and/or already determined and/or used parametrisation, e.g. of synchronisation signaling already accessed and/or identified. Such signaling parametrisation may be associated to a cell accessed for communication, in particular a serving cell. A parameter may represent or indicate a characteristic of the synchronisation signaling, which may be a physical characteristic or an assigned characteristic, e.g. an ID like a cell ID assigned to a specific synchronisation signaling, in particular a sequence.

Parameter/s of a parametrisation pertaining to synchronisation signaling may in particular indicate one or more of:
Timing, e.g. sequence timing and/or timing indicating when the synchronisation signaling is transmitted, e.g. a period and/or timing offset; and/or
Central frequency and/or frequency interval (bandwidth) of the carrier of the cell associated to the synchronisation signaling; and/or
Synchronisation frequency and/or frequency interval (bandwidth) of the synchronisation signaling; and/or
Numerology information, e.g. subcarrier spacing and/or subcarrier bandwidth, and/or cyclic prefix;
cell identity, e.g. cell ID and/or physical cell identity.

Configuration information may represent and/or comprise one or more such parameter/s. It should be noted that a signaling parametrisation may be considered to comprise one parametrisation with one or more parameters considered to correctly describe the second (serving) cell. In contrast, before measuring, the set of parametrisations mapped to the signaling parametrisations may be considered to represent candidates for synchronisation signaling to be measured and/or detected. In particular information related to numerology may greatly lower the number of measurements to be performed, as it provides the possibility to significantly limit the frequency space to be searched. The set of parametrisations may be mapped such that the numerology for all parametrisations is the same, e.g. based on the signaling parametrisation, and/or configuration information.

Signaling generally may be considered to comprise one or more signals or symbols. It may be considered that signaling may be associated to a specific cell.

A mapping may generally assign a set of parametrisations to a signaling parametrisation (and/or vice versa). The mapping may map one or more parameters of the signaling parametrisation to one or more parameters of each of the parametrisations of the set; the respective parameters may be different from each other (e.g., a frequency parameter may be mapped to a time parameter or cell id or signaling sequence). The mapping may comprise one or more sub-mappings, individually mapping one or more parameters. A mapping or submapping may be represented by a table and/or a function and/or relation. A function may in particular be linear in one or more parameters. The set of parametrisations may comprise an integer and/or limited number of parametrisations.

To a cell, there may be associated at least one carrier, which may be a primary carrier, e.g. in a carrier aggregation and/or dual connectivity, and/or a carrier to which reference signaling like synchronisation signaling is associated, e.g. transmitted on the carrier. It may be considered that a carrier comprises a plurality of subcarriers. A carrier may have assigned to it a central frequency or center frequency interval, e.g. represented by one or more subcarriers (to each subcarrier there may be generally assigned a frequency bandwidth or interval). A central frequency or interval of a carrier may be different from, and/or shifted in frequency compared to, a synchronisation frequency or interval of synchronisation signaling transmitted on the carrier, e.g. for the first cell and/or the second cell. The intervals may be arranged in the carrier, or shifted against each over, to have overlap, or without overlap. The intervals may be considered to be overlapping if they share at least one common subcarrier and/or share a common frequency subinterval. A cell may generally be a radio cell. It should be noted that the term "radio" in this disclosure may be considered to pertain to wireless communication in general, and may also include wireless communication utilising microwave frequencies. Wireless communication or radio may comprise and/or utilise an air interface, which may be associated to a RAN and/or be implemented according to an associated standard. Wireless communication may comprise (wirelessly) transmitting and/or receiving, in particular utilising the air interface and/or radio access network. A network node or user equipment or terminal adapted for using the air interface and/or for wireless/radio communication, and/or comprising radio circuitry, may be considered a radio node or radio network node.

A radio node that is being configured, e.g. by another node, may comprise a receiving module for such configuring, and/or may be adapted to use processing circuitry and/or radio circuitry, in particular a receiver, for being configured. The node configuring the radio node may comprise a configuring module for configuring, and/or may be adapted to use processing circuitry, in particular a transmitter, for the configuring.

Configuring may comprise transmitting a message and/or signaling and/or an indication representing and/or indicating the information or configuration or mapping to be configured, e.g. in the form of configuration data. Configuring may be performed with dedicated signaling (single- or multicast) and/or via broadcast, e.g. cell-wide.

The first cell and the second cell may be provided by and/or controlled by different network nodes. A network node providing and/or controlling a cell may be a radio node, e.g. utilising an air interface. The first cell may be controlled or provided by a first network node, the second cell by a second, different network node.

A control node may be a radio or network node. It may be considered that a control node is connected to one or more radio nodes or network nodes by wire and/or cable. In particular, a control node may be part of a core network, or connected to a node of a core network, and be connected to a network node providing one or more (radio) cells by wire and/or cable.

Any one or all of the modules disclosed herein may be implemented in software and/or firmware and/or hardware, e.g. circuitry described herein. Different modules may be associated to different components of a radio node, e.g. different circuitries or different parts of a circuitry. It may be considered that a module is distributed over different components, and/or that functionality of one module is distributed to and/or provided by more than one module. One module may provide the functionality associated to different modules, which thus may be referred to by different terms.

A wireless communication network may comprise a Radio Access Network (RAN), in particular according to a communication standard. A communication standard may in particular a standard according to 3GPP and/or 5G, e.g. according to NR or LTE Evolution. A RAN may generally be a RAN according to NR or LTE Evolution. It may be considered that a wireless communication network comprises a core network and/or one or more core network components, which may be connected to an associated radio access network.

BRIEF DESCRIPTION OF THE DRAWINGS

The drawings are provided to illustrate the concepts and approaches described herein, and are not intended to limit their scope. The drawings comprise:

FIG. 6, showing an exemplary network node.

DETAILED DESCRIPTION

Figure 1:
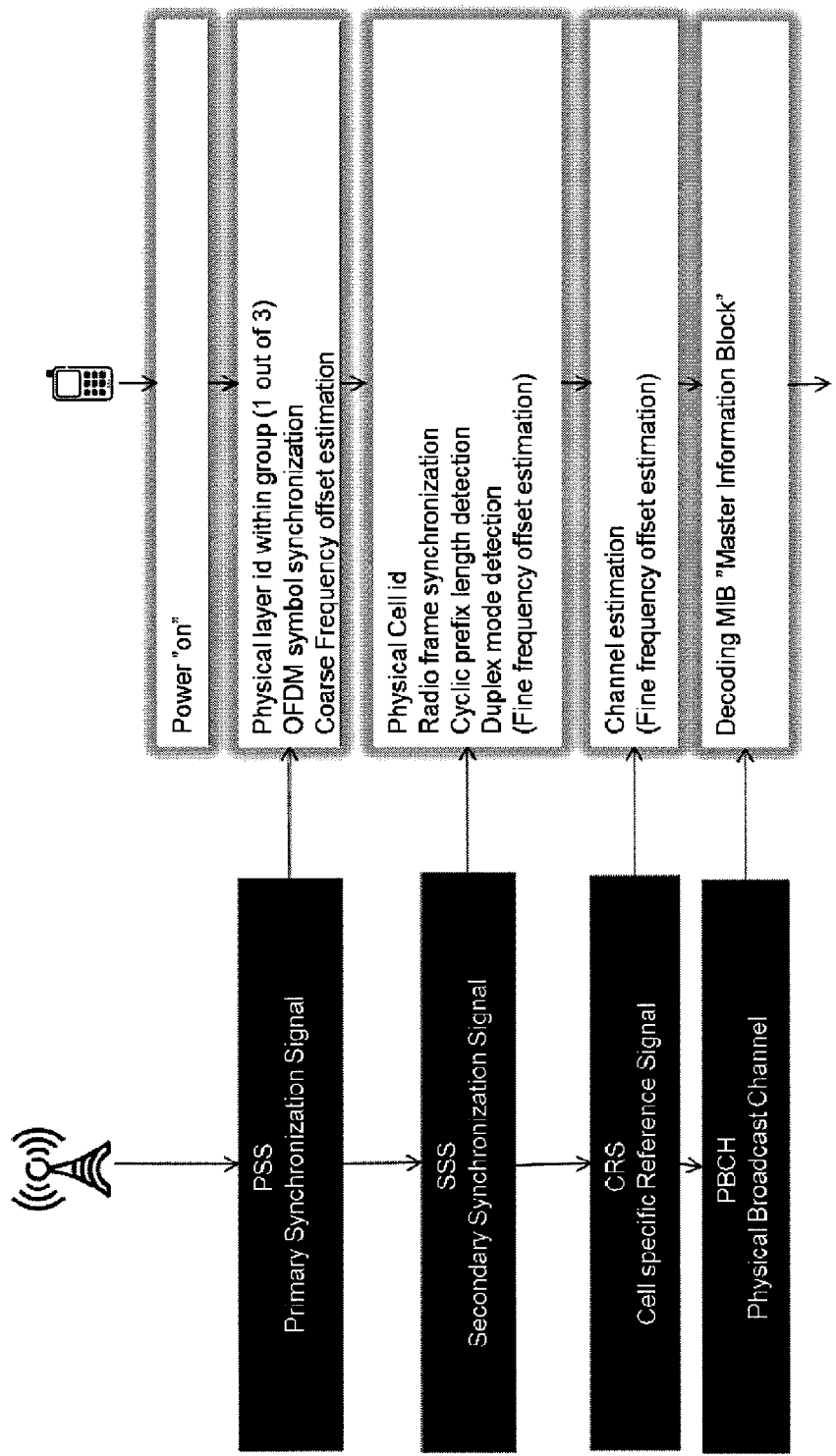
FIG. 1, showing a cell search procedure for LTE.

Synchronization in LTE is described as an example.

When a UE is powered on, or when it moves between cells in LTE release 8, it receives and synchronizes to downlink signals in a cell search procedure. The purpose of this cell search is to identify the best cell and to achieve time and frequency synchronization to the network in downlink (i.e. from base station to UE). A simplified initial cell search procedure is illustrated in. Here the UE tries to detect Primary Synchronisation Signaling, PSS, from which it can derive the cell identity within a cell-identity group, which consists of three different cell identities corresponding to three different PSS. In this detection, the UE thus has to blindly search for all of these three possible cell identities from a number of candidate band by the frequency raster operation. The UE also achieves OFDM symbol synchronization and a coarse frequency offset estimation with an accuracy of about 1 kHz.

The UE can then continue to detect Secondary Synchronisation Signaling, SSS, (coherent detection is possible due to PSS decoding having been performed) from which it acquires the physical cell id and achieves radio frame synchronization. Here, the UE also detects if normal or extended cyclic prefix is used. If the UE is not preconfigured for either TDD or FDD, the UE can detect the duplex mode by the position in the frame of detected SSS in relation to detected PSS. Fine frequency offset estimation can be estimated by correlating PSS and SSS. Alternatively, this fine frequency offset estimation is estimated by using the Cell specific Reference Signals (CRS) which are derived from the Physical Cell Identity (PCI) encoded in the PSS/SSS. Once the UE is capable of decoding the CRSs the UE can receive and decode cell system information which contains cell configuration parameters starting with the Physical Broadcast Channel (PBCH).

Synchronization in NR

There are expected to be at least two types of synchronization signals, denoted as NR-PSS and NR-SSS, defined to comprise basic functionality to provide time and frequency synchronization for the initial access and/or for measuring).

There are various requirements in NR, including requirements pertaining to energy saving, various numerologies and higher possible carrier frequencies. Transmission on periodical and static signals may need to be decreased and more flexible on various aspects compared to LTE. For the initial access, because of invalid or outdated system or random access information, the synchronization signals have to be provided periodically in downlink for UEs to obtain downlink synchronization for the following demodulation of the relevant system and random access information.

In LTE, the synchronization signals are in the center of the allocated band. Thus, the synchronization signals of neighbor cell and serving cell will in the same PRBs (Physical Resource Block) in frequency domain for a FDD (Frequency Division Duplex) system. For a TDD (Time Division Duplex) system, since the uplink and downlink shall be aligned, in addition to frequency domain overlap, the synchronization signals of neighbor cells will be overlapped in time domain, too. Therefore, when UE acquires the serving cell's PSS/SSS/PBCH (Physical Broadcast CHannel), it can also use this knowledge, e.g., frequency and time allocation information, to acquire the neighbor cells' PSS/SSS/PBCH resources without additional frequency raster.

In NR, the center frequency and/or the frequency interval for the synchronization signal can be different from the center frequency of the NR carrier.

Motivations for not using the center frequency for the synchronization signal comprise the desire to avoid interference of neighbor cells' NR-PSS/NR-SSS/NR-PBCH, and for flexible allocation of the synchronization signals.

However, since a UE doesn't know the neighbor cells NR-PSS/NR-SSS/NR-PBCH position from the detected serving cell's NR-PSS/NR-SSS/NR-PBCH, the UE has to do frequency raster even for the intra-frequency measurement (measurement on different cells within the same frequency interval, e.g. on the frequency interval of the serving cell). Performing a frequency scan or raster may introduce complexities for the UE when acquiring the synchronization channels when doing cell (re-) selection and measurement, and may cause increased UE power consumption for the synchronization channel acquisition. Synchronisation channel acquisition may be considered to comprise, and/or be implemented as, measuring synchronisation signaling, in particular of a neighbor cell (which may be considered first synchronisation signaling and first cell, respectively).

It is proposed that the allocation of the synchronization signaling and basic system and/or information of a first network node, e.g., providing neighboring cell(s), and a second network node, e.g., providing a serving cell, are associated. When the UE acquires the synchronization signaling of the second radio/network node, it can derive candidate positions and related information of the synchronization signaling of the first radio/network node. Accordingly, the UE complexity and the power consumption for the synchronization signals acquiring can be highly reduced.

The approaches described may reduce UE complexity to acquire the synchronization signals of a neighbor cell, avoiding frequent frequency raster when doing cell (re-) selection, and/or may reduce the UE power consumption for the synchronization signals acquisition, which may in particular of benefit for low cost terminals for initial access.

Figure 2:
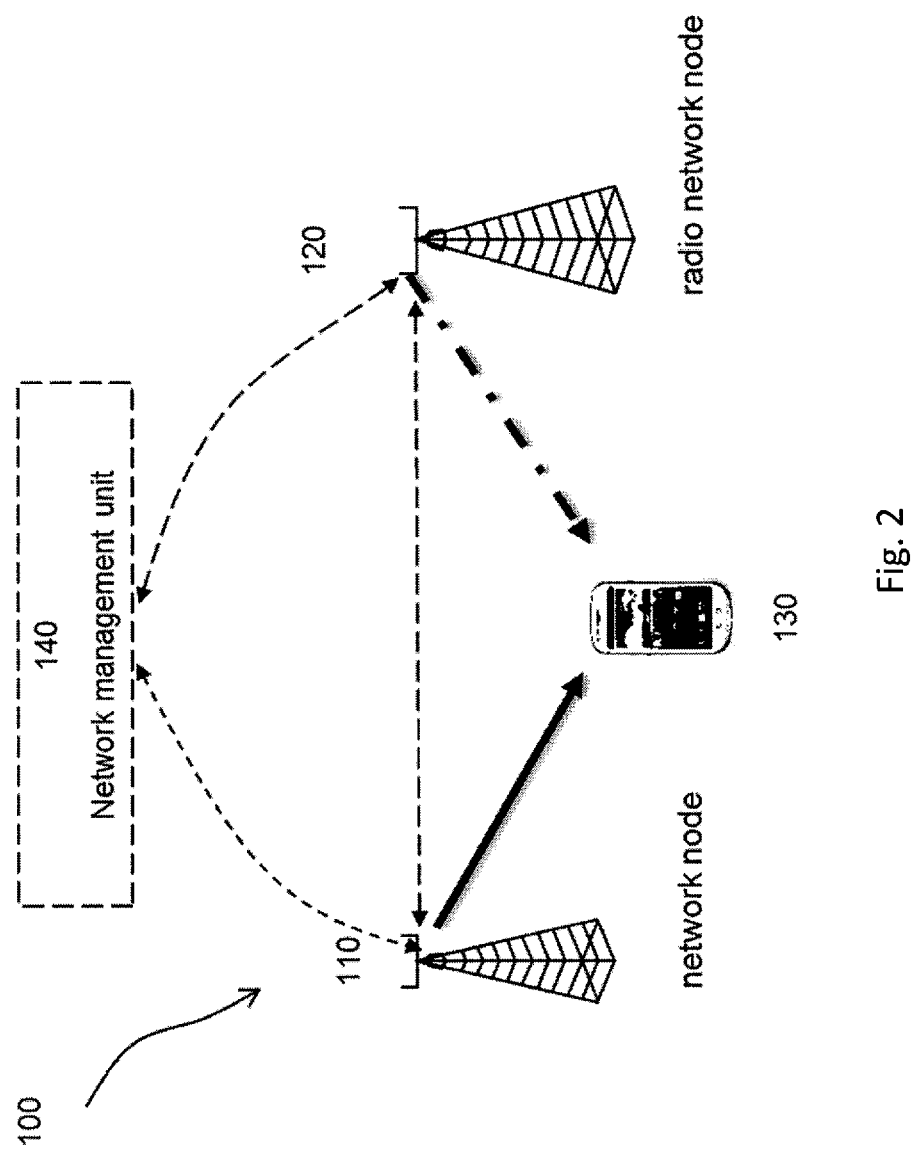
FIG. 2, showing an exemplary radio access network.

FIG. 2 shows an exemplifying RAN 100, in which variants described herein may be implemented. The RAN 100 may be a new radio (NR) system. In other examples, the RAN may be any wireless system including those based on 3GPP cellular communication systems, such as a Wideband Code Division Multiple Access (WCDMA) network, Long-term evolution system (LTE), a Global System for Mobile communication (GSM network), IEEE 802.16 family of wireless-networks standards, Worldwide Interoperability for Microwave Access (WiMAX), Wireless Local Network (WLAN) or the like.

The RAN (which may be referred to as radio communication system) 100 comprises a first radio network node 110 and a second radio network node 120. As used herein, the term "radio network node" may refer to a gNB, evolved Node B (eNB), a control node controlling one or more Remote Radio Units (RRUs), a radio base station, an access point, a relay or the like.

Furthermore, a user equipment 130 is served by the first radio network node 110. Expressed differently, the user equipment 130 may be associated with the first cell. As used herein, the term "user equipment" may refer to a mobile phone, a cellular phone, a Personal Digital Assistant (PDA) equipped with radio communication capabilities, a smartphone, a laptop or personal computer (PC) equipped with an internal or external mobile broadband modem, a tablet PC with radio communication capabilities, a portable electronic radio communication device, a sensor device equipped with radio communication capabilities or the like. The sensor may be any kind of weather sensor, such as wind, temperature, air pressure, humidity etc. As further examples, the sensor may be a light sensor, an electronic switch, a microphone, a loudspeaker, a camera sensor, etc.

Furthermore, the RAN 100 comprises a network management unit 160 for controlling for example the first and second radio network nodes 110, 120. In some variants, the network management unit 160 is an entity for handling information about subscription of the user of the user equipment 120, about user equipment context and/or about mobility of the user equipment 120, e.g. a Mobility Management Entity (MME). In some variants, the network management unit 160 is an entity responsible for operation and maintenance (O&M) tasks, e.g. an O&M node such as an Operation Support System (OSS). In some variants, the network management unit 160 is an entity for handling user plane traffic, such as a Serving Gateway (SGW). Thus, the network management unit 160 may be e.g. an O&M node/system, MME or SGW.

There may be considered a method of operation in a wireless device, like a UE or terminal, in a cellular communication network to get neighbor cell synchronization signals. The method may comprise obtaining information pertaining to the synchronization signaling of the second (or serving) radio network node, and further may comprise determining information pertaining to the first radio network node synchronization signaling based on the obtained information. The information pertaining to the synchronisation signaling of the second node may be considered to be represented by a signaling parametrisation. The information pertaining to the signaling of the first node may be represented by a set of parametrisations.

In some variants, obtaining the information further comprises obtaining the frequency and/or time location of the second radio network node synchronisation signaling. Generally, the information and/or parametrisation may indicate one or more of the following:

The bandwidth for the second radio network node synchronization signals; and/or

The system bandwidth for the second radio network node;

The numerology (e.g., subcarrier spacing, cyclic prefix length (CP length)) used by the second radio network node; and/or The identity of the second radio network node respectively of the cell, e.g. cell ID or physical ID.

The information may be acquired by UE detection or it can be acquired based on network node (e.g., eNB or gNB) signaling or configuring. The signaling may be RRC signaling, and/or MAC CE and/or dynamic signaling.

In some variants, determining the information of the first radio network node synchronization signal(s) further comprises determining the frequency and/or time location of the first radio network node synchronization signaling. The information or parametrisation may indicate one or more of the following: The bandwidth for the first radio network node synchronization signals; and/or The system bandwidth for the first radio network node; and/or The numerology (subcarrier spacing, cyclic prefix length (CP length)) used by the first radio network node; and/or The identity of the first radio network node.

In one example, assuming the center frequency position of the second radio network node is $f_1$ and the center frequency position of the first radio network node is $f_2$, and the bandwidth of the synchronization signals of the second radio network node is $BW_0$, the mth candidate for $f_2$ can be given by a mapping or submapping as:

$$f_2^{(m)} = f_1 + m*(BW_0 + \text{offset}), m = 0, 1, \ldots, M-1$$

where offset and M can be predefined and it can also be configured by signaling.

Herein, M means there are potentially M possible candidates frequency position for the first radio network node synchronization signaling. A UE may search the synchronization signals for the first radio network node from these M possible candidate frequency position. Since only M possible candidates are needed to be detected, the complexity is reduced significantly and the power consumption is reduced a lot. f1 in this context may be considered a parameter of a signaling parametrisation, describing a characteristic of the second synchronisation signaling, respectively the associated cell. The different f2s may be considered parameters of different parametrisations of a set of parametrisation.

Further, when UE gets the bandwidth of the synchronization signals of the second radio network node, and the UE gets the numerology used for the synchronization signals of the second radio network node, as one alternative, the UE can assume the same bandwidth and numerology are also applied in the first radio network node.

Alternatively or additionally, assuming the timing position of the second radio network node is $t_1$ and the timing position of the first radio network node is the nth candidate of $t_2$ can be given by a mapping or submapping as:

$$t_2^{(n)} = t_1 + \text{offset}_n, n = 0, 1, \ldots, N-1$$

where $\text{offset}_n$ and N can be predefined and they can also be configured by signaling.

Herein, N means there are potentially N possible candidates time position for the first radio network node synchronization signals. A UE may search the synchronization signaling of the first radio network node from these N possible candidate time position. Since only N possible candidates are needed to be detected or measured, the complexity is reduced significantly and further the power consumption is reduced. Also, requirements for data buffering may be relaxed.

In another aspect, a method of operation in a wireless device like a terminal or UE, in a cellular communication network to measure neighbor cell synchronization signals comprises obtaining information pertaining to the synchronization signaling of a second radio network node, and optionally may comprise acquiring configuration information for the first radio network node. Information pertaining to the first radio network node synchronization signaling may be determined based on the obtained information and the said acquired configuration information. Measuring may be performed based on such determined information.

Configuration information, may generally indicate one or more of the following:

The mapping; and/or

The frequency location, frequency or frequency interval of the first radio network node synchronization signaling, e.g. for one or more candidates; and/or The timing or time location for the first radio network node synchronization signaling, e.g. for one more candidates; and/or The frequency offset of the first radio network node synchronization signaling related to the second radio network node synchronization for one or more candidates; and/or The time offset of the first radio network node synchronization signaling related to the second radio network node synchronization signaling for one or more candidates; and/or The bandwidth (frequency interval) for the first radio network node synchronization signaling, e.g. for one or more candidates; and/or The system bandwidth for the first radio network node for one or more candidates; and/or The numerology (e.g. subcarrier spacing, cyclic prefix length (CP length)) used by the first radio network node, e.g. for one or more candidates; and/or The identity of the first radio network node, e.g. for one or more candidates.

Generally, information may be acquired by UE detection (measuring), or it can be acquired based on network node signaling or configuring, e.g. by an eNB or gNB. The signaling may be RRC signaling, and/or MAC CE and/or dynamic signaling.

The information may be acquired from the second radio network node synchronization, and/or it may be acquired from the first radio network node synchronization.

Figure 3:
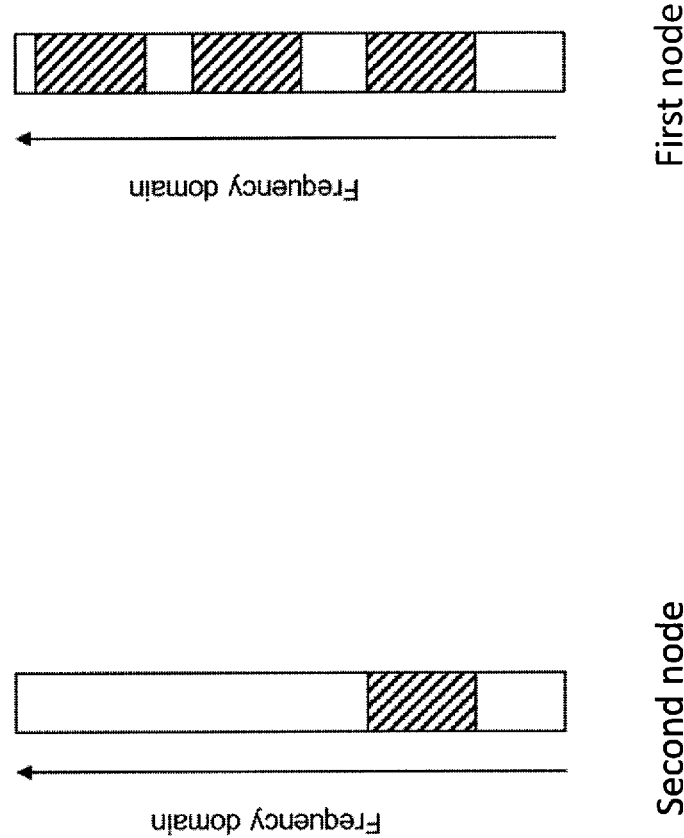
FIG. 3, showing a representation of an exemplary mapping.
Figure 4:
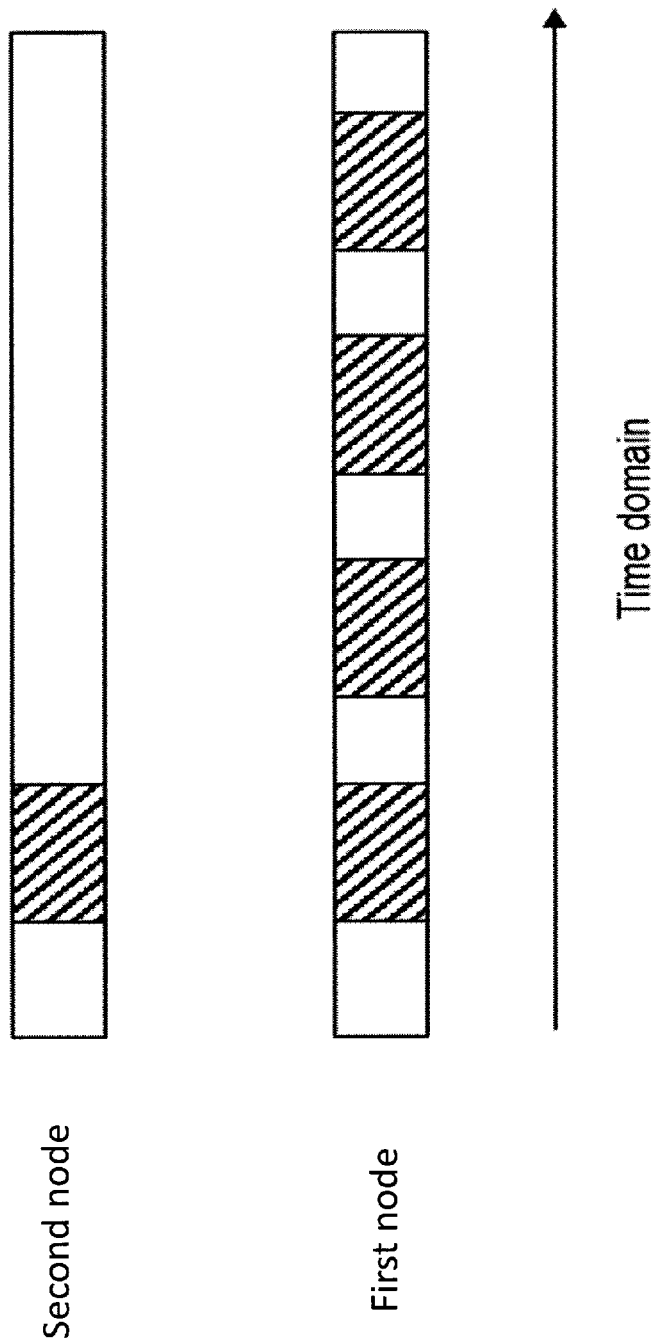
FIG. 4, showing a representation of another exemplary mapping.

FIG. 3 shows an exemplary mapping of a frequency interval to three candidate frequency intervals associated to different parametrisations of a set. FIG. 4 shows an exemplary mapping of a timing to three candidate timings interval associated to different parametrisations of a set.

Figure 5:
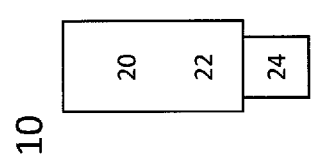
FIG. 5, showing an exemplary user equipment.

FIG. 5 schematically shows a terminal 10, which may be implemented as a UE (User Equipment). Terminal 10 comprises processing circuitry (which may also be referred to as control circuitry) 20, which may comprise a controller connected to a memory. Any module of the terminal, e.g. a determining and/or receiving module, may be implemented in and/or executable by, the processing circuitry 20, in particular as module in the controller. Terminal 10 also comprises radio circuitry 22 providing receiving and transmitting or transceiving functionality (e.g., one or more transmitters and/or receivers and/or transceivers), the radio circuitry 22 being connected or connectable to the control circuitry. An antenna circuitry 24 of the terminal 10 is connected or connectable to the radio circuitry 22 to collect or send and/or amplify signals. Radio circuitry 22 and the processing circuitry 20 controlling it are configured for cellular communication with a network, e.g. a RAN as described herein. Terminal 10 may generally be adapted to carry out any of the methods for operating a terminal or UE disclosed herein; in particular, it may comprise corresponding circuitry, e.g. processing circuitry, and/or modules.

FIG. 6 schematically shows a network node 100, which in particular may be an eNB, or gNB or similar for NR. Network node 100 comprises processing circuitry (which may also be referred to as control circuitry) 120, which may comprise a controller connected to a memory. Any module, e.g. transmitting module and/or configuring module of the network node 100 may be implemented in and/or executable by the processing circuitry 120. The processing circuitry 120 is connected to control radio circuitry 122 of the radio node 100, which provides receiver and transmitter and/or transceiver functionality (e.g., comprising one or more transmitters and/or receivers and/or transceivers). An antenna circuitry 124 may be connected or connectable to radio circuitry 122 for signal reception or transmittance and/or amplification. The network node 100 may be adapted to carry out any of the methods for operating a network node disclosed herein; in particular, it may comprise corresponding circuitry, e.g. processing circuitry, and/or modules. The antenna 124 circuitry may be connected to and/or comprise an antenna array. The network node 100, respectively its circuitry, may be adapted to transmit configuration data and/or to configure a terminal as described herein.

A radio node may generally be considered a device or node adapted for wireless and/or radio (and/or microwave) frequency communication, and/or for communication utilising an air interface, e.g. according to a communication standard.

A radio node may be a (radio) network node, or a user equipment or terminal. A network node may be any radio node of a wireless communication network or RAN, e.g. a base station and/or gNodeB (gNB, a base station for NR) or eNodeB and/or relay node and/or micro/nano/pico/femto node and/or other node, in particular for a RAN as described herein.

The terms user equipment (UE) and terminal may be considered to be interchangeable in the context of this disclosure. A user equipment or terminal may represent and end device for communication utilising the wireless communication network, and/or be implemented as a user equipment according to a standard. Examples of user equipments may comprise a phone like a smartphone, a personal communication device, a mobile phone or terminal, a computer, in particular laptop, a sensor or machine with radio capability (and/or adapted for the air interface), in particular for MTC (Machine-Type-Communication, sometimes also referred to M2M, Machine-To-Machine), or a vehicle adapted for wireless communication. A user equipment may be mobile or stationary.

A radio node may generally comprise processing circuitry and/or radio circuitry. Circuitry may comprise integrated circuitry. Processing circuitry may comprise one or more processors and/or controllers (e.g., microcontrollers), and/or ASICs (Application Specific Integrated Circuitry) and/or FPGAs (Field Programmable Gate Array), or similar. It may be considered that processing circuitry comprises, and/or is (operatively) connected or connectable to one or more memories or memory arrangements. A memory arrangement may comprise one or more memories. A memory may be adapted to store digital information. Examples for memories comprise volatile and non-volatile memory, and/or Random Access Memory (RAM), and/or Read-Only-Memory (ROM), and/or magnetic and/or optical memory, and/or flash memory, and/or harddisk memory, and/or EPROM or EEPROM (Erasable Programmable ROM or Electrically Erasable Programmable ROM). Radio circuitry may comprise one or more transmitters and/or receivers and/or transceivers (which may be operable as transmitter and receiver), and/or may comprise one or more amplifiers and/or oscillators and/or filters, and/or may comprise, and/or be connected or connectable to antenna circuitry and/or one or more antennas. A radio node may comprise, and/or be connected or connectable to antenna circuitry and/or a plurality of antennas, in particular a number of antennas which is a power of 2. The antennas may be at least in part independently controllable. It may be considered that a radio node is adapted to utilise a controllable number of the number of antennas for transmitting and/or receiving, e.g. controllable by radio circuitry and/or processing circuitry. Antenna circuitry may generally comprise one or more antennas and/or associated circuitry, in particular integrated circuitry, e.g. one or more preamplifiers and/or filters and/or converters.

A measurement report (representing measurement reporting) may generally represent information based on, and/or pertaining to, measurement/s that have been performed on reference signaling. The report type may pertain to the measurement report. A measurement report may comprise and/or indicate measurement samples and/or information pertaining thereto and/or parameters determined based on measurements performed, and/or information related to channel state or quality, e.g. CSI information, e.g. CQI and/or PMI and/or RI. The report may contain values computed and/or estimated and/or calculated based on measurement results, as examples of a report being based on and/or determined based on measurements. A measurement report may indicate a motion status, and/or be considered a motion status indication. In particular, a network node/radio node may be adapted to determine, and/or may comprise a determining module, and/or perform determining, a motion status based on a (received) measurement report. Such determining may be based on, and/or comprise, processing and/or evaluating the measurement report.

There is disclosed a carrier (or storage) medium arrangement carrying and/or storing at least any one of the program products described herein and/or code executable by processing and/or control circuitry, the code causing the processing and/or control circuitry to perform and/or control at least any one of the methods described herein. A carrier medium arrangement may comprise one or more carrier media. Generally, a carrier medium may be accessible and/or readable and/or receivable by processing circuitry. Storing data and/or a program product and/or code may be seen as part of carrying data and/or a program product and/or code. A carrier medium generally may comprise a guiding/transporting medium and/or a storage medium. A guiding/transporting medium may be adapted to carry and/or carry and/or store signals, in particular electromagnetic signals and/or electrical signals and/or magnetic signals and/or optical signals. A carrier medium, in particular a guiding/transporting medium, may be adapted to guide such signals to carry them. A carrier medium, in particular a guiding/transporting medium, may comprise the electromagnetic field, e.g. radio waves or microwaves, and/or optically transmissive material, e.g. glass fiber, and/or cable. A storage medium may comprise at least one of a memory, which may be volatile or non-volatile, a buffer, a cache, an optical disc, magnetic memory, flash memory, etc.

A cell may be generally a communication or and/or radio cell, e.g., of a cellular or mobile communication network, provided by a node. A serving cell may be a cell on or via which a network node (the node providing or associated to the cell, e.g., base station or eNB or gNB) transmits and/or may transmit data (which may be data other than broadcast data) to a user equipment, in particular control and/or user or payload data, and/or via or on which a user equipment transmits and/or may transmit data to the node; a serving cell may be a cell for or on which the user equipment is configured and/or to which it is synchronized and/or has performed an access procedure, e.g., a random access procedure, and/or in relation to which it is in a RRC_connected or RRC_idle state, e.g., in case the node and/or user equipment and/or network follow the LTE-standard. One or more carriers (e.g., uplink and/or downlink carrier/s and/or a carrier for both uplink and downlink) may be associated to a cell.

A cellular network or mobile or wireless communication network may comprise e.g., an LTE network (FDD or TDD), UTRA network, CDMA network, WiMAX, GSM network, any network employing any one or more radio access technologies (RATs) for cellular operation, e.g. NR. A cellular network or system may operate and/or be based on cells. The description herein is given for LTE, but it is not limited to the LTE RAT, but could also be applicable for LTE Evolution or Next Radio or any 5G technology. It may be considered for cellular communication there is provided at least one uplink (UL) connection and/or channel and/or carrier and at least one downlink (DL) connection and/or channel and/or carrier, e.g., via and/or defining a cell, which may be provided by a network node, in particular a base station or eNodeB. An uplink direction may refer to a data transfer direction from a terminal to a network node, e.g., base station and/or relay station. A downlink direction may refer to a data transfer direction from a network node, e.g., base station and/or relay node, to a terminal. UL and DL may be associated to different frequency resources, e.g., carriers and/or spectral bands. A cell may comprise at least one uplink carrier and at least one downlink carrier, which may have different frequency bands. A network node, e.g., a base station or eNodeB, may be adapted to provide and/or define and/or control one or more cells, e.g., a PCell and/or a LA cell. Cellular DL operation and/or communication of a wireless device or UE may refer to receiving transmissions in DL, in particular in cellular operation and/or from a radio node/network node/eNB/base station. Cellular UL operation of a wireless device or UE may refer to UL transmissions, in particular in cellular operation, e.g. transmitting to a network or radio node/network node/eNB/base station.

An eNodeB (eNB) may be envisioned as an example of a network node or radio node or base station, e.g. according to an LTE standard. A gNB may be considered a radio node or network node or base station according to NR. A radio node may generally be any network node (node of the network) adapted for wireless communication, e.g. via an air interface and/or with one or more terminals. Examples of radio nodes comprise base stations, relay nodes, femto-, pico-, nano-, or micro-nodes, etc. It may be considered that a radio node or base station is connected or connectable to a core network like an Evolved Packet Core (EPC) and/or to provide and/or connect to corresponding functionality. The functionality and/or multiple different functions of a radio node or base station may be distributed over one or more different devices and/or physical locations and/or nodes. A radio node or base station may be considered to be a node of a wireless communication network.

Measuring, also referred to as performing measurements, may include measuring signaling, and/or performing processing based thereon, e.g. filtering, averaging, integrating, normalizing, scaling, weighting, determining and/or extracting and/or providing samples, etc. The latter may be based on, and/or performed by, a sample determining device, and/or be performed during measuring, or after, and/or while or before preparing a measurement report.

Configuring (e.g., with or for a configuration) a device like a terminal or radio node or network node may comprise bringing the device into a state in accordance with the configuration, and/or may comprise indicating information to the device. A device may generally configure itself, e.g. by adapting a configuration. Configuring a terminal, e.g. by a network node, may comprise transmitting a configuration or configuration data indicating a configuration to the terminal, and/or instructing the terminal, e.g. via transmission of configuration data, to adapt the configuration configured. Configuration data may for example be represented by broadcast and/or multicast and/or unicast data, and/or comprise downlink control information, e.g. DCI according to 3GPP standardization. Scheduling may comprise allocating resource/s for uplink and/or downlink transmissions, and/or transmitting configuration or scheduling data indicative thereof. Configuring a, or by a, device like a terminal or UE may comprise setting one or more parameters and/or registers of the terminal or UE and/or tuning and/or setting one or more components or subsystems and/or circuitry, e.g. a processing circuitry and/or radio circuitry, in particular to bring the device into a desired operation mode. A device may be adapted for configuring itself, e.g. based on configuration and/or allocation data, which it may receive from a network or network node.

In this disclosure, for purposes of explanation and not limitation, specific details are set forth (such as particular network functions, processes and signaling steps) in order to provide a thorough understanding of the technique presented herein. It will be apparent to one skilled in the art that the present concepts and aspects may be practiced in other embodiments and variants that depart from these specific details.

For example, the concepts and variants are partially described in the context of Long Term Evolution (LTE) or LTE-Advanced (LTE-A) or LTE Evolution or NR mobile or wireless or cellular communications technologies; however, this does not rule out the use of the present concepts and aspects in connection with additional or alternative mobile communication technologies such as the Global System for Mobile Communications (GSM). While the following embodiments will partially be described with respect to certain Technical Specifications (TSs) of the Third Generation Partnership Project (3GPP), it will be appreciated that the present concepts and aspects could also be realized in connection with different Performance Management (PM) specifications.

Moreover, those skilled in the art will appreciate that the services, functions and steps explained herein may be implemented using software functioning in conjunction with a programmed microprocessor, or using an Application Specific Integrated Circuit (ASIC), a Digital Signal Processor (DSP), a Field Programmable Gate Array (FPGA) or general purpose computer. It will also be appreciated that while the embodiments described herein are elucidated in the context of methods and devices, the concepts and aspects presented herein may also be embodied in a program product as well as in a system comprising processing circuitry, e.g. a computer processor and a memory coupled to the processor, wherein the memory is encoded with one or more programs or program products that execute the services, functions and steps disclosed herein.

It is believed that the advantages of the aspects and variants presented herein will be fully understood from the foregoing description, and it will be apparent that various changes may be made in the form, constructions and arrangement of the exemplary aspects thereof without departing from the scope of the concepts and aspects described herein or without sacrificing all of its advantageous effects. Because the aspects presented herein can be varied in many ways, it will be recognized that any scope of protection should be defined by the scope of the claims that follow without being limited by the description.

What is claimed is:

1. A method for operating a user equipment in a radio access network, the method comprising:
   measuring a first synchronization signal associated to a first cell of the radio access network, the measuring utilizing a set of parametrizations of the first synchronization signal, the set of parametrizations of the first synchronization signal being determined based on:

a signaling parametrization of a second synchronization signal associated to a second cell of the radio access network, and a mapping of the signaling parametrization of the second synchronization signal to the set of parametrizations of the first synchronization signal, the mapping being performed according to:

$$f_2^{(m)} = f_1 + m*(BW_0 + \text{offset}), m = 0, 1, \ldots, M-1,$$

wherein $f^1$ is a center frequency of a second network node associated with the second cell, $f_2$ is a center frequency of a first network node associated with the first cell, $BW_0$ is a bandwidth of at least one synchronization signal of the second network node, M is a number of candidate frequency positions for at least one synchronization signal of the first network node, offset is an offset parameter, and $f_2^{(m)}$ represents an mth candidate for $f_2$.

2. The method of claim 1, wherein the first cell is a neighbor cell, and the second cell is a serving cell.

3. The method of claim 1, wherein the set of parametrizations includes at least one of: a sequence timing, a timing indicating when at least one synchronization signaling is transmitted, a bandwidth of a carrier of at least one of the first cell and the second cell, a center frequency of the carrier of at least one of the first cell and the second cell, a synchronization frequency of the synchronization signaling, a bandwidth of the synchronization signaling, a subcarrier spacing, a subcarrier bandwidth, a cyclic prefix, and a cell identity.

4. A user equipment for a radio access network, the user equipment including processing circuitry, the processing circuitry being configured to:

measure a first synchronization signal associated to a first cell of the radio access network, the measuring utilizing a set of parametrizations of the first synchronization signal, the set of parametrizations of the first synchronization signal being determined based on:

a signaling parametrization of a second synchronization signal associated to a second cell of the radio access network, and a mapping of the signaling parametrization of the second synchronization signal to the set of parametrizations of the first synchronization signal, the mapping being performed according to:

$$f_2^{(m)} = f_1 + m*(BW_0 + \text{offset}), m = 0, 1, \ldots, M-1,$$

wherein $f_1$ is a center frequency of a second network node associated with the second cell, $f_2$ is a center frequency of a first network node associated with the first cell, $BW_0$ is a bandwidth of at least one synchronization signal of the second network node, M is a number of candidate frequency positions for at least one synchronization signal of the first network node, offset is an offset parameter, and $f_2$ (m) represents an mth candidate for $f_2$.

5. The user equipment of claim 4, wherein the first cell is a neighbor cell, and the second cell is a serving cell.

6. The user equipment of claim 4, wherein the set of parametrizations includes at least one of: a sequence timing, a timing indicating when at least one synchronization signaling is transmitted, a bandwidth of a carrier of at least one of the first cell and the second cell, a center frequency of the carrier of at least one of the first cell and the second cell, a synchronization frequency of the synchronization signaling, a bandwidth of the synchronization signaling, a subcarrier spacing, a subcarrier bandwidth, a cyclic prefix, and a cell identity.

7. A method for operating a first network node in a radio access network, the method comprising:

transmitting a first synchronization signal in a first cell of the radio access network controlled by the first network node, the first synchronization signal being represented by a first parametrization, the first parametrization being chosen from a set of parametrizations of the first synchronization signal, the set of parametrizations of the first synchronization signal being determined based on a mapping from a signaling parametrization of a second synchronization signal associated to a second cell of the radio access network to the set of parametrizations of the first synchronization signal, the mapping being performed according to:

$$f_2^{(m)} = f_1 + m*(BW_0 + \text{offset}), m = 0, 1, \ldots, M-1,$$

wherein $f_1$ is a center frequency of a second network node associated with the second cell, $f_2$ is a center frequency of a first network node associated with the first cell, $BW_0$ is a bandwidth of at least one synchronization signal of the second network node, M is a number of candidate frequency positions for at least one synchronization signal of the first network node, offset is an offset parameter, and $f_2$ (m) represents an mth candidate for $f_2$.

8. The method of claim 7, wherein the first cell is a neighbor cell, and the second cell is a serving cell.

9. The method of claim 7, wherein the set of parametrizations includes at least one of: a sequence timing, a timing indicating when at least one synchronization signaling is transmitted, a bandwidth of a carrier of at least one of the first cell and the second cell, a center frequency of the carrier of at least one of the first cell and the second cell, a synchronization frequency of the synchronization signaling, a bandwidth of the synchronization signaling, a subcarrier spacing, a subcarrier bandwidth, a cyclic prefix, and a cell identity.

10. A first network node for a radio access network, the first network node including processing circuitry, the processing circuitry being configured to:

cause transmission of a first synchronization signal in a first cell of the radio access network controlled by the first network node, the first synchronization signal being represented by a first parametrization, the first parametrization being chosen from a set of parametrizations of the first synchronization signal, the set of parametrizations of the first synchronization signal being determined based on a mapping from a signaling parametrization of a second synchronization signal associated to a second cell of the radio access network to the set of parametrizations of the first synchronization signal, the mapping being performed according to:

$$f_2^{(m)} = f_1 + m*(BW_0 + \text{offset}), m = 0, 1, \ldots, M-1,$$

wherein $f_1$ is a center frequency of a second network node associated with the second cell, $f_2$ is a center frequency of a first network node associated with the first cell, $BW_0$ is a bandwidth of at least one synchronization signal of the second network node, M is a number of candidate frequency positions for at least one synchronization signal of the first network node, offset is an offset parameter, and $f_2$ (m) represents an mth candidate for $f_2$.

11. The first network node of claim 10, wherein the first cell is a neighbor cell, and the second cell is a serving cell.

12. The first network node of claim 10, wherein the set of parametrizations includes at least one of: a sequence timing, a timing indicating when at least one synchronization signaling is transmitted, a bandwidth of a carrier of at least one of the first cell and the second cell, a center frequency of the carrier of at least one of the first cell and the second cell, a synchronization frequency of the synchronization signaling, a bandwidth of the synchronization signaling, a subcarrier spacing, a subcarrier bandwidth, a cyclic prefix, and a cell identity.

13. A method for operating a control node in a wireless communication network including the control node, a first network node, and a second network node, the method comprising:

indicating, to the first network node, a set of parametrizations representing a first synchronization signal to be associated to a first cell of the first network node, the set of parametrizations being determined based on a mapping from a signaling parametrization of a second synchronization signal associated to a second cell of the second network node, the mapping being performed according to:

$$f_2^{(m)} = f_1 + m*(BW_0 + \text{offset}), m=0,1,\ldots,M-1,$$

wherein $f_1$ is a center frequency of a second network node associated with the second cell, $f_2$ is a center frequency of a first network node associated with the first cell, $BW_0$ is a bandwidth of at least one synchronization signal of the second network node, M is a number of candidate frequency positions for at least one synchronization signal of the first network node, offset is an offset parameter, and $f_2$ (m) represents an mth candidate for $f_2$.

14. The method of claim 13, wherein the first cell is a neighbor cell, and the second cell is a serving cell.

15. The method of claim 13, wherein the set of parametrizations includes at least one of: a sequence timing, a timing indicating when at least one synchronization signaling is transmitted, a bandwidth of a carrier of at least one of the first cell and the second cell, a center frequency of the carrier of at least one of the first cell and the second cell, a synchronization frequency of the synchronization signaling, a bandwidth of the synchronization signaling, a subcarrier spacing, a subcarrier bandwidth, a cyclic prefix, and a cell identity.

16. A control node for a wireless communication network including the control node, a first network node, and a second network node, the control node including processing circuitry, the processing circuitry being configured to indicate, to the first network node, a set of parametrizations representing a first synchronization signal to be associated to a first cell of the first network node, the set of parametrizations being determined based on a mapping from a signaling parametrization of a second synchronization signal associated to a second cell of the second network node, the mapping being performed according to:

$$f_2^{(m)} = f_1 + m*(BW_0 + \text{offset}), m=0,1,\ldots,M-1,$$

wherein $f_1$ is a center frequency of a second network node associated with the second cell, $f_2$ is a center frequency of a first network node associated with the first cell, $BW_0$ is a bandwidth of at least one synchronization signal of the second network node, M is a number of candidate frequency positions for at least one synchronization signal of the first network node, offset is an offset parameter, and $f_2^{(m)}$ represents an mth candidate for $f_2$.

17. The control node of claim 16, wherein the first cell is a neighbor cell, and the second cell is a serving cell.

* * * * *